(12) United States Patent
Gu (10) Patent No.: US 9,775,112 B2
(45) Date of Patent: Sep. 26, 2017

(54) ENABLING AND DISABLING LOW ENERGY, SHORT-RANGE WIRELESS COMMUNICATION MODULES

(71) Applicant: GM GLOBAL TECHNOLOGY OPERATIONS LLC, Detroit, MI (US)

(72) Inventor: Wen Gu, Novi, MI (US)

(73) Assignee: GM GLOBAL TECHNOLOGY OPERATIONS LLC., Detroit, MI (US)

( * ) Notice: Subject to any disclaimer, the term of this patent is extended or adjusted under 35 U.S.C. 154(b) by 138 days.

(21) Appl. No.: 14/801,573

(22) Filed: Jul. 16, 2015

(65) Prior Publication Data

US 2017/0019855 A1 Jan. 19, 2017

(51) Int. Cl.
| | |
|---|---|
| *G08C 17/00* | (2006.01) |
| *H04W 52/02* | (2009.01) |
| *H04W 4/00* | (2009.01) |
| *H04W 4/02* | (2009.01) |
| *H04W 4/20* | (2009.01) |

(52) U.S. Cl.
CPC ....... *H04W 52/0229* (2013.01); *H04W 4/008* (2013.01); *H04W 4/023* (2013.01); *H04W 4/206* (2013.01); *Y02B 60/50* (2013.01)

(58) Field of Classification Search
CPC ..... H04W 4/008; H04W 4/023; H04W 48/10; H04W 4/206; H04W 52/0229
USPC .......................................................... 370/311
See application file for complete search history.

(56) References Cited

U.S. PATENT DOCUMENTS

| | | | |
|---|---|---|---|
| 8,626,144 B2 | 1/2014 | Talty et al. | |
| 2006/0116070 A1* | 6/2006 | Lauper | G06Q 30/0265 455/3.01 |
| 2009/0191849 A1* | 7/2009 | Fioretti | H04L 12/5855 455/412.2 |
| 2012/0258669 A1 | 10/2012 | Honkanen et al. | |
| 2012/0323423 A1* | 12/2012 | Nakamura | B60L 11/123 701/22 |
| 2014/0188348 A1* | 7/2014 | Gautama | B60W 10/30 701/48 |
| 2014/0357192 A1 | 12/2014 | Azogui et al. | |

FOREIGN PATENT DOCUMENTS

| | | |
|---|---|---|
| WO | WO2014/080252 | 5/2014 |
| WO | WO2014/087196 | 6/2014 |

* cited by examiner

*Primary Examiner* — Mang Yeung
(74) *Attorney, Agent, or Firm* — Harness, Dickey & Pierce, P.L.C.

(57) ABSTRACT

A system includes a vehicle communications platform (VCP) operatively disposed in a vehicle and in communication with a server. The VCP has a low energy, short-range wireless communication module, including advertising ON and OFF modes. The advertising ON mode enables the module to broadcast an advertising event, and is triggered when i) vehicle position data indicates that the vehicle is not at its garage address or ii) wireless device position data indicates that the wireless device is within a preset range of the vehicle. The advertising OFF mode inhibits the module from broadcasting the advertising event, and is triggered when i) vehicle position data indicates that the vehicle is at its garage address or ii) wireless device position data indicates that the wireless device is not within the preset range of the vehicle.

20 Claims, 3 Drawing Sheets

ENABLING AND DISABLING LOW ENERGY, SHORT-RANGE WIRELESS COMMUNICATION MODULES

TECHNICAL FIELD

The present disclosure relates generally to enabling and disabling low energy, short-range wireless communication modules.

BACKGROUND

Many consumer electronic devices are equipped with Bluetooth capabilities that allow two devices to automatically sync and communicate with one another after an initial device pairing. Bluetooth is an open wireless technology standard that allows devices to communicate within one another over short distances (e.g., less than 30 meters). Bluetooth may be used to automatically link two wireless devices, such as a personal device (e.g., phone) and another wireless communicating device (e.g., tablet or other computer, headset, etc.), for automatically downloading files, messages, music, video, and for various other applications.

SUMMARY

A system is disclosed herein. An example of the system includes a server, a vehicle, and a vehicle communications platform operatively disposed in the vehicle and in communication with the server. The vehicle communications platform has a low energy, short-range wireless communication module, which includes advertising ON and OFF modes. The advertising ON mode enables the module to broadcast an advertising event. The advertising ON mode is triggered when i) first vehicle position data indicates that the vehicle is not at its garage address or ii) first position data of a wireless device received from the server indicates that the wireless device is within a preset range of the vehicle. The advertising OFF mode inhibits the module from broadcasting the advertising event. The advertising OFF mode is triggered when i) second vehicle position data indicates that the vehicle is at its garage address or ii) second position data of the wireless device received from the server indicates that the wireless device is not within the preset range of the vehicle.

Examples of methods for enabling or inhibiting low energy, short-range wireless communication advertisements are also disclosed herein.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The example systems and methods disclosed herein utilize low energy, short-range wireless communication technology. Low energy, short-range wireless communication technology refers to a wireless personal area network technology that provides reduced power consumption while maintaining a better or similar communication range (e.g., 100 meters or less) when compared to other short-range wireless technology standards. An example of the low energy, short-range wireless communication technology is BLUETOOTH® low energy (i.e., BLUETOOTH® LE (BLE) or BLUETOOTH® Smart). BLUETOOTH® low energy enabled devices consume a fraction of the power of conventional BLUETOOTH® enabled devices, while maintaining a better or similar communication range. As an example of the low energy, the maximum/peak power consumption may be about 15 mA and the average power consumption may be about 1 uA.

In the examples disclosed herein, the vehicle includes a low energy, short-range wireless communication module equipped with hardware that supports the low energy, short-range wireless communication technology. The low energy, short-range wireless communication module is switchable between two modes, including an advertising ON mode and an advertising OFF mode. When in the advertising ON mode, the low energy, short-range wireless communication module is a peripheral device that can broadcast its presence, through an advertising event, to nearby listening/scanning device(s) (which may be referred to as central devices). In the advertising OFF mode, the low energy, short-range wireless communication module is inhibited from broadcasting its presence. In the examples disclosed herein, the mode of the low energy, short-range wireless communication module depends upon the position of the vehicle with respect to its garage address and/or the position of the vehicle with respect to another wireless device that is low energy, short-range wireless communication technology enabled. The ability of the low energy, short-range wireless communication module to be switched between the advertising ON and OFF modes provides dynamic control of advertising events, prolongs vehicle battery life by limiting the time duration of advertising events, and reduces vehicle exposure (through advertising events) when the vehicle is not located in one of the positions associated with the advertising ON mode.

As used herein, "advertising events" include signals that are broadcast from a low energy, short-range wireless communication module indicating the identity of the device, what the device is capable of doing, what services the device provides, or other like messages.

Figure 1:
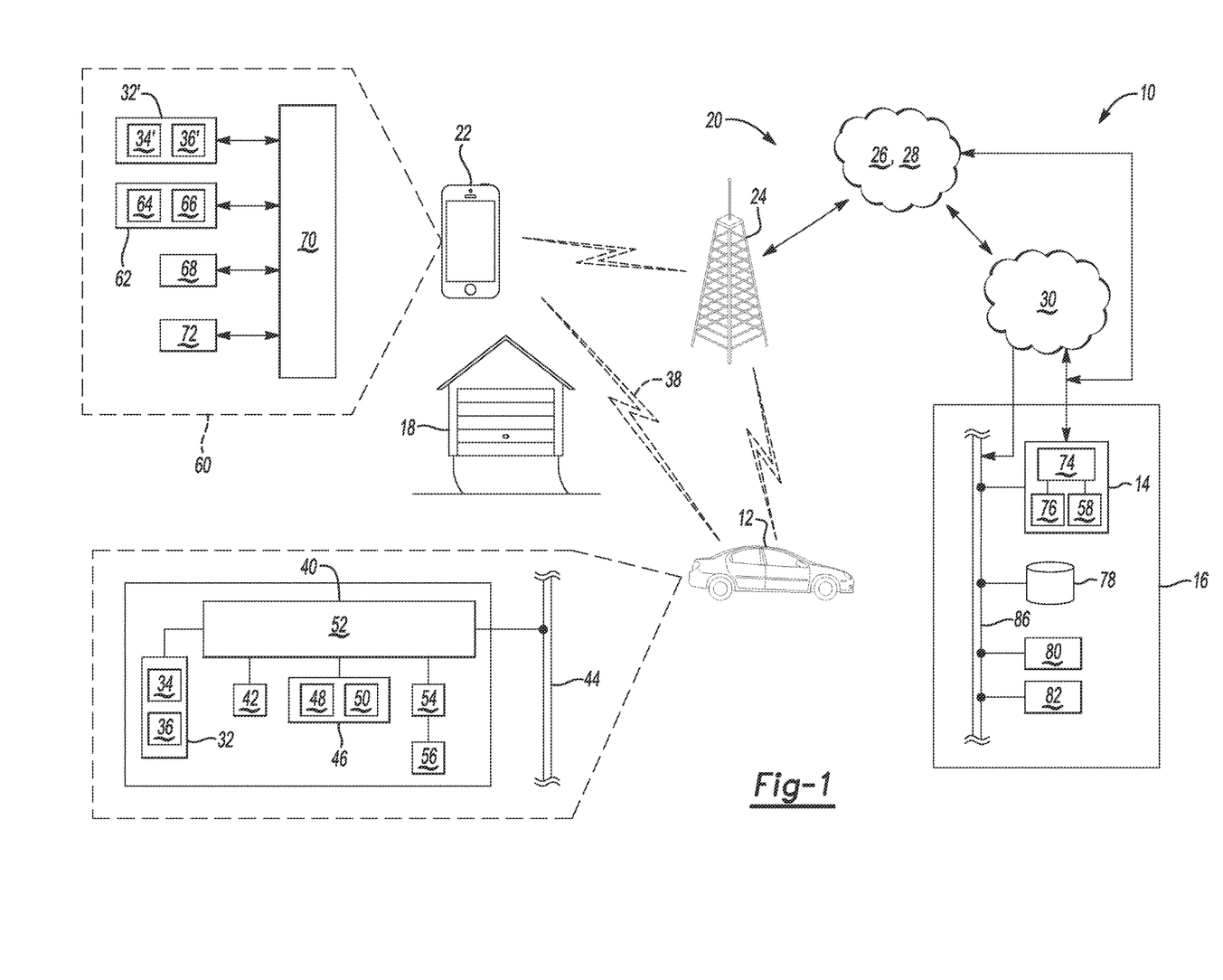
FIG. 1 is a schematic view of an example of a system for enabling or inhibiting low energy, short-range wireless communication advertisements.

Referring now to FIG. 1, an example of a system 10 for enabling or inhibiting low energy, short-range wireless communication advertisements is depicted. In one example, the system 10 includes the vehicle 12, a server 14 (which may be part of a center 16 that provides back-end services to the vehicle 12), a structure 18 associated with the vehicle's garage address, and a carrier/communication system 20. In another example, the system 10 includes the vehicle 12, the server 14, a wireless device 22 that is low energy, short-range wireless communication technology enabled, and the carrier/communication system 20.

In some of the examples disclosed herein, phone calls and/or data (e.g., location or position data, etc.) may be transmitted to, from, and/or between communication component(s) of the vehicle 16, the wireless device 22, and/or the server 14 using the carrier/communication system 20. Some of these communication links between the various components are shown as lightning bolts and arrows in FIG. 1.

In an example, the carrier/communication system 20 is a two-way radio frequency (RF) communication system. The carrier/communication system 20 may include one or more cell towers 24 or satellites (not shown). It is to be understood that the carrier/communication system 20 may also include one or more base stations and/or mobile switching centers (MSCs) 26 (e.g., for a 2G/3G network), one or more evolved Node Bs (eNodeB) and evolved packet cores (EPC) 28 (for a 4G (long-term evolution, LTE) network), and/or one or more land networks 30. The carrier/communication system 20 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/communication system 20 may be GSM (global system for mobile telecommunications), CDMA2000, UMTS (universal mobile telecommunications system), LTE, or some other available architecture.

An Internet connection may also be utilized for the transmission of message(s), position data, etc. In this example, the transmission of the message(s), position data, etc. may be made using the carrier/communication system 20, either through the vehicle's Internet connection (e.g., when the vehicle 12 is equipped with a 4G long-term evolution, LTE, or other suitable Internet connection) or through the wireless device's cellular and Internet connection.

Other communications (e.g., advertising events) may be transmitted to, from, and/or between short-range wireless communication component(s) of the vehicle 12 and/or the wireless device 22. The short range wireless communication component(s) of the vehicle 12 includes at least the low energy, short-range wireless communication module 32, and the short range wireless communication component(s) of the wireless device 22 includes at least the low energy, short-range wireless communication module 32'. In one example, each of the low energy, short-range wireless communication modules 32, 32' is a BLE module. Each of these modules 32, 32' includes a respective transceiver 34, 34' (or a transmitter and a receiver) and a respective node 36, 36'. Each transceiver 34, 34' includes a respective signal emitter for transmitting signals/data and a respective signal receiver for receiving signals/data. The respective nodes 36, 36' allow the module 32, 32' to communicate, via a short-range wireless communication link 38, with other device(s) that are low energy, short-range wireless communication enabled. The node 36, 36' provides the autonomous communication link 36 with the other enabled device(s) after an initial pairing between the two modules 32, 32'. The nodes 34, 34' may be standalone chipsets/modems, or may be integrated as part of the transceiver 34, 34', or may be integrated as part of any other circuit in the module 32, 32'.

It is to be understood that each of the modules 32, 32' has a unique identifying code (e.g., a wireless connection key) that is used to pair the respective module 32, 32' with a module of another enabled device. Two devices are paired with each other when the modules 32, 32' of those devices exchange their unique identifying codes with each other. For example, the module 32 in the vehicle 12 and the module 32' in the wireless device 22 are paired when they exchange their unique identifying codes with each other. This enables the vehicle 12 and the wireless device 22 to communicate typically under a secured connection (e.g., autonomous communication link 36).

As a more specific example, initial pairing may involve setting the wireless device 22 to a short range wireless discovery mode (such as by selecting, on the wireless device 22, a discovery mode function as a menu option, icon, or the like). While in the discovery mode, other devices configured for low energy, short-range wireless communications (such as the vehicle 12 including module 32) are allowed to detect the presence of the wireless device 22. When the module 32 locates the wireless device 22, the wireless device 22 automatically provides the type of device it is (e.g., a smart phone, a tablet computer, etc.) and its short range wireless connection name. The wireless device 22 may then prompt the user to enter a security code/password, and then the unique identifying code of the wireless device 22 is sent to the module 32 of the vehicle 12. Upon receiving the unique identifying code, the module 32 sends its own unique identifying code to the module 32' of the wireless device 22 to ultimately pair the two devices 12 and 22 together. After the initial pairing, the respective devices 12, 22 will automatically establish the communication link 36 without having to pair again, as long as the devices 12, 22 are within short range of one another and the module 32 is in the advertising ON mode.

In addition to the low energy, short-range wireless communication module 32, 32', each of the vehicle 12 and the wireless device 22 includes several other components. The vehicle 12 and the wireless device 22 will now be described separately.

In the examples disclosed herein, the vehicle 12 may be a car, motorcycle, truck, or recreational vehicle (RV). The vehicle 12 is equipped with suitable hardware and computer readable instructions/code that allow it to communicate (e.g., transmit and/or receive voice and data communications) over the carrier/communication system 20 and to enable and disable the low energy, short-range wireless communication module 32.

At least some of the hardware and computer readable instructions/code are embodied in a vehicle communication/communications platform (VCP) 40. In an example, the VCP 40 is an on-board vehicle dedicated communications and entertainment device. In another example (not shown), the VCP 40 is an on-board vehicle dedicated communications device (e.g., a telematics unit), and the vehicle 12 includes a separate on-board vehicle dedicated entertainment device (e.g., an infotainment unit). Whether integrated into a single unit (e.g., VCP 40) or included as separate units, the on-board vehicle dedicated communications and entertainment device(s) include hardware components that are capable of running computer readable instructions/code, which are embodied on non-transitory, tangible computer readable media.

The VCP 40 may provide a variety of services, both individually and through its communication with the center 20 (e.g., which may be a facility that is owned and operated by an in-vehicle infotainment unit service provider). One example of these services includes the VCP 40 and the server 14 working together to switch the low energy, short-range wireless communication module 32 to the appropriate advertising mode based, at least in part on the vehicle's location. Several other examples of the services include, but are not limited to: turn-by-turn directions and other navigation-related services provided in conjunction with a location detection unit 42; airbag deployment notification and other emergency or roadside assistance-related services provided in connection with various sensor interface modules and sensors located throughout the vehicle 12; and infotainment-related services where music, Web pages, movies, television programs, videogames and/or other content is downloaded by the VCP 30 via a vehicle bus system 44 and an audio bus system (not shown). The listed services are by no means an exhaustive list of all the capabilities of the VCP 40, but are simply an illustration of some of the services that the VCP 40 is capable of offering.

The VCP 40 may be used for vehicle communications. In the examples disclosed herein, the VCP 40 may communicate with the server 14 in order to receive position information of the vehicle 12 or of the wireless device 22. These, as well as some other, vehicle communications utilize radio or satellite transmissions to establish a voice channel with the carrier/communication system 20 such that both voice and data transmissions may be sent and received over the voice channel. In some instances, vehicle communications are enabled through the VCP 40 via a communications module 46, which includes a cellular chipset/component 48 for voice communications and a data transmission system 50 for data transmission.

The cellular chipset/component 48 of the VCP 40 may be an analog, digital, dual-mode, dual-band, multi-mode and/or multi-band wireless transceiver. The cellular chipset/component 48 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

In an example, the data transmission system 50 may include a packet builder, which is programmed to make decisions about what packet to send (e.g., bandwidth, data to include, etc.) and to actually build a packet data message. In another example, the data transmission system 50 may include a wireless modem, which applies some type of encoding or modulation to convert the digital data so that it can communicate through a vocoder or speech codec incorporated in the cellular chipset/component 48. It is to be understood that any suitable encoding or modulation technique that provides an acceptable data rate and bit error may be used with the examples disclosed herein. While examples have been provided, it is to be understood that any suitable data transmission system 50 may be used.

The VCP 32 may also be configured for short-range wireless communication technologies in addition to the low energy, short-range wireless communication technology. Examples of other short-range wireless communication technologies includes standard BLUETOOTH® and various classes thereof, dedicated short-range communications (DSRC), or WI-FI™ and various classes thereof.

The location detection unit 42 may include a GPS receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection unit 42 may also include, for example, Glonass (i.e., global navigation satellite system), Sbas (i.e., satellite-based augmentation systems), or a D-GPS (differential global positioning system). The location detection chipset/component 42 may or may not be part of an in-vehicle navigation unit.

When the vehicle 12 is within the coverage area of the carrier/communication system 20, the location detection unit 42 and the server 14 may be in constant communication, so that the server 14 continuously has real time position data of the vehicle 12.

The VCP 40 also includes an electronic processing device 52 operatively coupled to one or more types of electronic memory 54. In an example, the electronic processing device 52 is a microprocessor. In other examples, the electronic processing device 52 may be a micro controller, a controller, and/or a host processor. In another example, electronic processing device 52 may be an application specific integrated circuit (ASIC). The electronic memory 54 of the VCP 40 may be an encrypted memory that is configured to store i) computer readable instructions/code to be executed by the processor 52, ii) data associated with the various systems of the vehicle 12 (i.e., vehicle data, VIN, etc.), iii) the vehicle garage address and/or preset ranges, and/or the like. The electronic memory 54 may be a non-transitory, tangible computer readable media (e.g., RAM).

In the examples disclosed herein, the VCP 40 is programmed to determine whether the advertising ON mode or the advertising OFF mode of the low energy, short-range wireless communication module 32 should be implemented, and to instruct the module 32 accordingly. To perform these operations, the VCP 40 executes computer readable instructions 56 that are stored on the memory 54. These instructions 56 will be described in more detail in reference to FIGS. 2 and 3.

The vehicle 12 may have a garage address associated therewith. The garage address is the address of the structure 18 that is identified as being the home of the vehicle 12. For a personal vehicle, the garage address may be the home address of the vehicle owner. For a business or fleet vehicle, the garage address may be the address of the business or of the place where the vehicle 12 is stored during non-use. The garage address may be stored in the memory 54 of the vehicle 12, or it may be stored in an electronic memory 58 of the server 14. In some examples of the method, the garage address is compared with a current position of the vehicle 12 to determine whether the advertising ON mode or the advertising OFF mode of the low energy, short-range wireless communication module 32 should be implemented. More particularly, when the current position of the vehicle 12 indicates that it is not at its garage address, the advertising ON mode may be triggered/enabled. Similarly, when the current position of the vehicle 12 indicates that it is at its garage address, the advertising OFF mode may be triggered/enabled.

The vehicle 12 may have a preset range associated therewith. The preset range identifies how close the wireless device 22 has to be with respect to the vehicle position in order to trigger the advertising ON mode. In an example, the preset range may be a maximum distance from the vehicle 12. As an example of this type of preset range, if the position of the wireless device 22 is at the maximum distance or is less than the maximum distance from the vehicle's current position, the advertising ON mode may be triggered/enabled. Similarly, if the position of the wireless device 22 is greater than the maximum distance from the vehicle's current position, the advertising OFF mode may be triggered/enabled. In another example, the preset range may be a geo-boundary around the vehicle 12. The geo-boundary may be any virtual regular or irregular shape that has the vehicle 12 at its center. As the vehicle 12 moves, the coordinates of the geo-boundary change, but the shape does not change. As an example, a virtual circle with the vehicle 12 at the center and a predefined radius may be set as the geo-boundary. As an example of this type of preset range, if the position of the wireless device 22 is within the geo-boundary, the advertising ON mode may be triggered/enabled. Similarly, if the position of the wireless device 22 is outside the geo-boundary, the advertising ON mode may be triggered/enabled.

As mentioned above, some examples of the system 10 include the wireless device 22. In the examples disclosed herein, the wireless device 22 may be any mobile device, including a smart phone, such as a GSM/LTE phone or a GSM/CDMA/LTE phone. In other examples, the wireless device 22 may be any portable device that has a mobile device communication platform 60. Examples of other wireless devices 22 include a wearable device (e.g., foot pod, smart bracelet, smart watch, helmet, etc.), a tablet computer, a key fob, etc., each of which may be, for example, GPS, cellular/Internet wireless communication enabled, and low energy, short range-wireless communication enabled.

As shown in FIG. 1, the mobile device communication platform 60 includes the low energy, short-range wireless communication module 32'. As discussed above, the low energy, short-range wireless communication capability (e.g., BLUETOOTH® LE or Smart, and variations thereof) enables the wireless device 22 to communicate with other low energy, short-range wireless communication devices (e.g., vehicle 12). In the examples disclosed herein, the wireless device 22 may be a listening/scanning device. As such, the low energy, short-range wireless communication module 32' may be in a scanning mode where it continuously scans for an advertising event signal or another signal from another enabled device.

The mobile device communication platform 60 may also include a location detection unit 68. The location detection unit 68 may be similar to the location detection unit 42 of the vehicle 12. As an example, the location detection unit 68 may be a GPS receiver that provides accurate time and latitude and longitude coordinates of the wireless device 22 responsive to a GPS broadcast signal received from a GPS satellite constellation (not shown).

The mobile device communication platform 60 may also include a communications module 62, which includes a cellular chipset/component 64 for voice communications and a data transmission unit 66 for data transmission. Using the communications module 62, the wireless device 22 is capable of making cellular or satellite connections and/or Internet connections (over the wireless carrier/communication system 20). As an example, the wireless device 22 may transmit its current location (as determined by the location detection unit 68) to the server 14 as a data message using the data transmission unit 66 and the wireless carrier/communication system 20. When the wireless device 22 is within the coverage area of the carrier/communication system 20, the wireless device 22 and the server 14 may be in constant communication, so that the server 14 continuously has real time position data of the wireless device 12.

The wireless device 22 also includes physical hardware (e.g., a microprocessor 70) and computer readable instructions stored in an electronic memory 72. The microprocessor 70 of the wireless device 22 may be similar to processor 62 of the vehicle 12, and is capable of executing the computer readable instructions stored in the memory 46', which may be similar to the electronic memory 54.

In the system 10, the vehicle 12 is, or both the vehicle 12 and the wireless device 22 are in communication with the server 14, which is part of the center 16.

It is to be understood that the center 16 shown in FIG. 1 may be virtualized and configured in a Cloud Computer, that is, in an Internet-based computing environment. For example, the server 14 (and other computing equipment) may be accessed as a Cloud platform service, or PaaS (Platform as a Service), utilizing Cloud infrastructure rather than hosting server 14 at the center 16. In these instances, the server 14 (and other center 16 components) may be virtualized as a Cloud resource. The Cloud infrastructure, known as IaaS (Infrastructure as a Service), typically utilizes a platform virtualization environment as a service, which may include components such as processor(s) 74, 80, database(s) 78, server 14, and other computer equipment. In an example, the real-time services performed by the server 14 disclosed herein may be performed in the Cloud via the SaaS (Software as a Service).

The server 14 may be a system of computer hardware and computer readable instructions that is capable of supplying the vehicle 12 with data, which the VCP 40 of the vehicle 12 uses to determine which of the advertising modes of the module 32 should be triggered.

As shown in FIG. 1, the server 14 includes the processor 74, and the center 16 may also include additional processor(s) 80. The processors 74, 80 may be a controller, a host processor, an ASIC, or a processor working in conjunction with a central processing unit (CPU). The processor 74 is capable of executing the computer readable instructions that are stored on the electronic memory 58.

The server 14 also includes a server communication transceiver 76 that is in selective communication with both the VCP 40 and the mobile device communications platform 60. The server communication transceiver 76 may be any suitable data transmission system that is capable of sending and/or receiving data communications over the carrier/communication system 20. For example, the server communication transceiver 76 is capable of receiving the vehicle position data (including the location coordinates and a time-stamp) from the VCP 40 of the vehicle 12. For another example, the server communication transceiver 76 is capable of receiving the wireless device position data (including the location coordinates and a time-stamp) from the mobile device communications platform 60 of the wireless device 22. The server communication transceiver 76 can also transmit the position data (of the vehicle 12 and/or of the wireless device 22) to the vehicle 12.

In addition to the position data, the server communication transceiver 76 can also retrieve data (e.g., the garage address and/or the preset range) from a profile of the vehicle 12 (stored in the memory 58 or a database 78), and transmit this data to the vehicle 12. The retrieval of data may be in response to a request for such data that is received from the VCP 40 of the vehicle 12.

The database(s) 78 may be designed to store vehicle record(s), subscriber/user profile records, or any other pertinent subscriber and/or vehicle information and/or mobile communications device information. In an example, the database(s) 78 may be configured to store the user profile, which may contain personal information of the subscriber (e.g., the subscriber's name, the garage address and/or preset ranges of the vehicle 12, a billing address, a home phone number, a cellular phone number, etc.) and/or information of the vehicle 12 (e.g., identification number, etc.). It is to be understood that the databases 78 may allow the center 16 to function as a repository for data collected from the vehicle 12. In some instances, another facility may function as a repository for the collected data (e.g., a customer relationship management system (not shown) associated with the center 16 whose database(s) the server 14 can access).

As illustrated in FIG. 1, the various center components may be coupled to one another via a network connection or bus 84 such as one similar to the vehicle bus 44 previously described.

In addition to the server 14, the center 16 may also include other components, such as additional processor(s) 80 and/or switch(es) 82. In some instance, the center 16 may also include advisor(s) (not shown). The additional processor(s) 80, which may be used in conjunction with telecommunication and computer equipment (not shown), may generally be equipped with suitable software and/or programs enabling the processor(s) 80 to accomplish a variety of center functions or tasks. The telecommunication and computer equipment (including computers) may include a network of servers (including server 14) coupled to both locally stored and remote databases (e.g., database 78) of any information processed. The switch(es) 82 may be private branch exchange (PBX) switch(es). The switch 82 routes incoming signals so that voice transmissions are usually sent to either a live advisor or an automated response system, and data transmissions are passed on to a modem or other piece of equipment (e.g., a communications module) for demodulation and further signal processing. Position information from the vehicle 12 and/or the wireless device 22 and/or data requests from the vehicle 12 may be transmitted to the server 14.

Different components of the system 10 may be used to perform different examples of the method for enabling or inhibiting low energy, short-range wireless communication advertisements or advertising events. One example of the method 100 is shown in FIG. 2 and another example of the method 200 is shown in FIG. 3.

Figure 2:
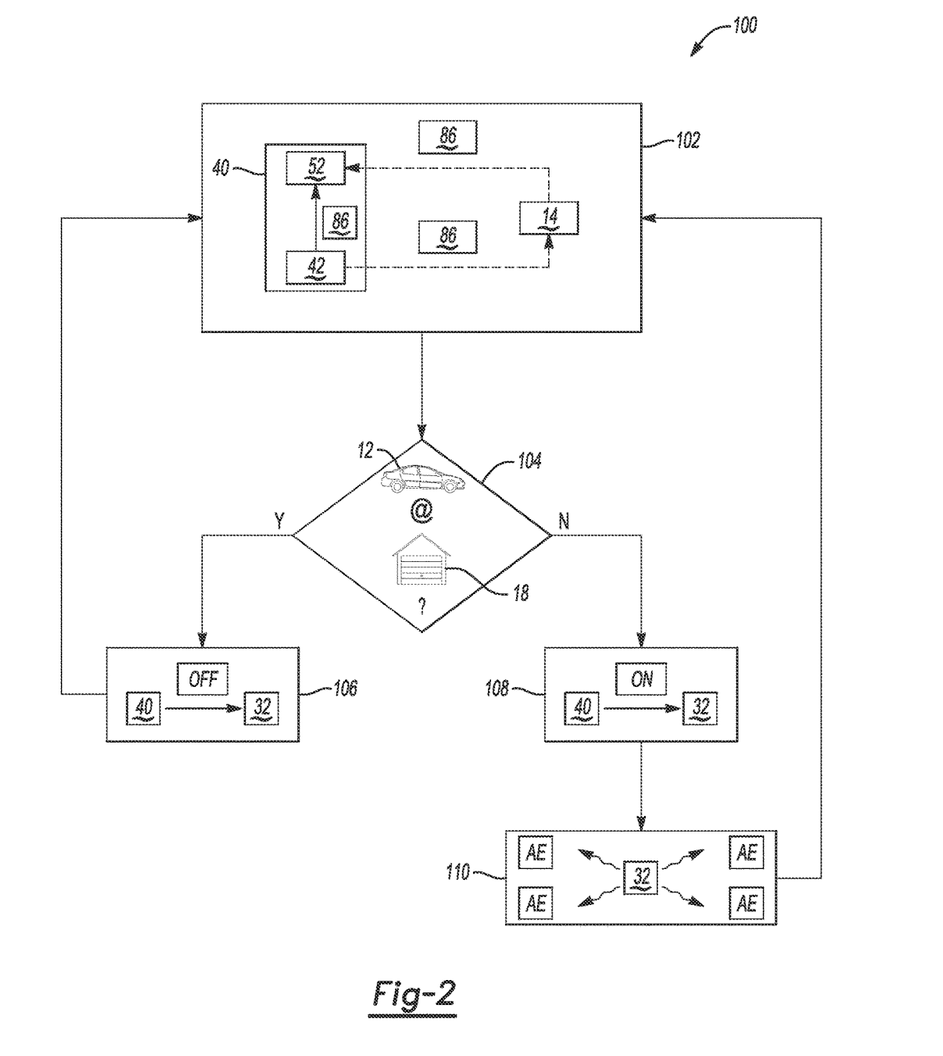
FIG. 2 is a flow diagram illustrating an example of a method for enabling or inhibiting low energy, short-range wireless communication advertisements.
Figure 3:
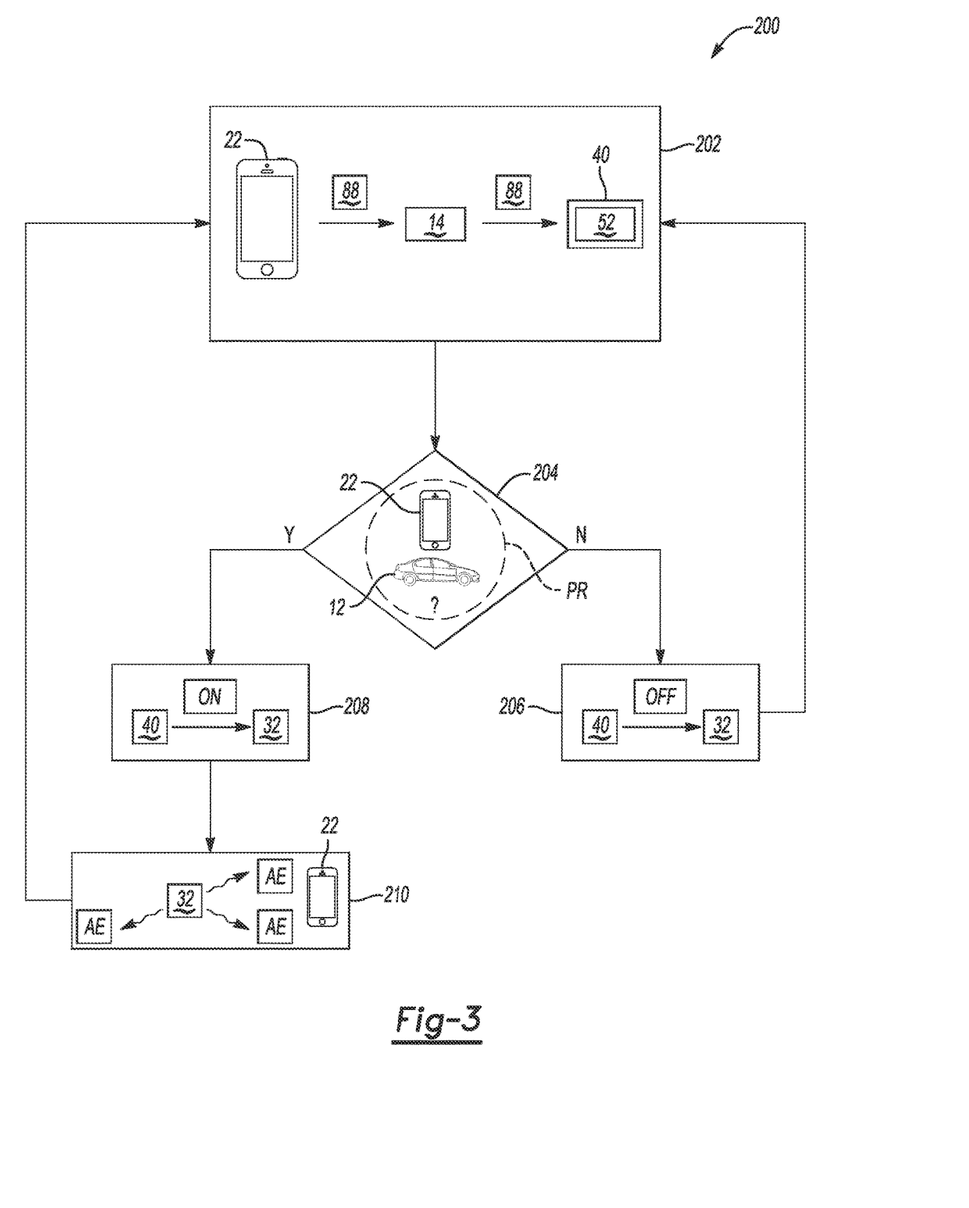
FIG. 3 is a flow diagram illustrating another example of a method for enabling or inhibiting Bluetooth low energy advertisements.

In the example of the method 100 shown in FIG. 2, the mode of the low energy, short-range wireless communication module 32 depends upon the position of the vehicle 12 with respect to its garage address.

At reference numeral 102, vehicle position data 86 is received by the processor 52 of the VCP 40. In one example, the processor 52 receives the vehicle position data 86 directly from the location detection unit 42 that is onboard the vehicle 12. In another example, the processor 52 receives the vehicle position data 86 from the server 14. The VCP 40 and the server 14 may be in continuous communication when the vehicle 12 is within a network coverage area of the carrier/communication system 20, and thus the vehicle position data 86 stored at the server 14 may be real-time information.

While not shown in FIG. 2, the receipt of the vehicle position data 86 from the server 14 may be in response to a request from the vehicle 12. As an example, the VCP 40 may recognize that the vehicle 12 has entered park mode (i.e., the transmission has been put into park), or that the vehicle engine has been turned off or powered down, or some other event indicating that the vehicle 12 is no longer on. The VCP 40 may transmit a data message (through communications module 46) requesting the then-current position from the server 14. In response, the server 14 may retrieve the last received vehicle position (which may be transmitted to the server 14 when park mode is entered, the vehicle 12 is shut down, etc.), and may transmit this information to the VCP 40.

Upon receiving the vehicle position data 86, the VCP 40 (through processor 52 running computer-readable instructions 56) compares the received vehicle position data 86 with the vehicle's garage address (i.e., the address of the structure 18 that is identified as being the home of the vehicle 12). This is shown at reference numeral 104.

To make the comparison, the VCP 40 also obtains the vehicle's garage address. The garage address may be stored in the memory 54 of the VCP 40, or in the memory 58 of the server 14, or in the database 78 of the center 16. When the garage address is stored in the memory 54, the VCP 40 may be programmed to retrieve the stored garage address and make the comparison with the vehicle position data 86. When the garage address is stored in the memory 58 of the server 14 or in the database 78 of the center 16, the VCP 40 may be programmed to send a request to the server 14, which retrieves the stored garage address and transmits it back to the VCP 40. In one example, the VCP 40 may receive the vehicle position data 86 and the vehicle's garage address simultaneously from the server 14.

Through the comparison of the vehicle position data 86 and the vehicle's garage address, the VCP 40 is programmed to determine whether the vehicle 12 is located at the structure 18 associated with the garage address.

When the vehicle position data 86 indicates that the vehicle 12 is located at the structure 18 associated with the garage address ("Y" in FIG. 2), the VCP 40 is programmed (by processor 52 running computer readable instructions 56) to transmit advertising OFF mode instructions to the low energy, short-range wireless communication module 32. This is shown at reference numeral 106. The advertising OFF mode instructions trigger or instruct the module 32 to enter the advertising OFF mode. The module 32 is responsive to the advertising OFF mode instructions from the VCP 40, and thus enters the advertising OFF mode. In the advertising OFF mode, the module 32 enters a sleep mode or turns itself off. When in sleep mode or turned off, the module 32 is inhibited from broadcasting the advertising event.

When the vehicle position data 86 indicates that the vehicle 12 is not located at the structure 18 associated with the garage address ("N" in FIG. 2), the VCP 40 is programmed (by processor 52 running computer readable instructions 56) to transmit advertising ON mode instructions to the low energy, short-range wireless communication module 32. This is shown at reference numeral 108. The advertising ON mode instructions trigger or instruct the module 32 to enter the advertising ON mode. The module 32 is responsive to the advertising ON mode instructions from the VCP 40, and thus enters the advertising ON mode.

As shown at reference numeral 110, when in the advertising ON mode, the module 32 is a peripheral device that can broadcast something (e.g., its presence and/or function(s)), through the advertising event AE, to nearby listening/scanning device(s) (e.g., wireless device 22, not shown in this figure). If a nearby listening/scanning device(s) is within the short range and is an enabled device, the vehicle 12 and the nearby listening/scanning device(s) can perform an initial pairing, or if already paired, can establish the short-range wireless communication link 38.

Whether the module 32 is in the advertising OFF mode (reference numeral 106) or the advertising ON mode (reference numeral 110), the method 100 disclosed herein may be repeated when updated vehicle position data is received. This enables the module 32 to be switched between the ON and OFF modes, depending upon the then-current position of the vehicle 12 with respect to the garage address of the vehicle 12.

When the vehicle 12 is located at the garage address, the user is often away from the vehicle 12. The example of the method 100 shown in FIG. 1 may reduce vehicle exposure in these instances. Additionally, the method 100 may prolong the vehicle's battery life, in part because the module 32 is drawing little to no power from the battery in the OFF mode.

In the example of the method 200 shown in FIG. 3, the mode of the low energy, short-range wireless communication module 32 depends upon the position of the wireless device 22 with respect to the vehicle 12.

At reference numeral 202, wireless device position data 88 is received by the server 14. The mobile device communications platform 60 and the server 14 may be in continuous communication when the wireless device 12 is within a network coverage area of the carrier/communication system 20. As such, the server 14 may continuously (or at preset intervals) receive updated wireless device position data 88.

In one example, the message including the wireless device position data 88 that is transmitted to the server 14 may also include an identifier of the wireless device 22 that is transmitting the data 88. In one example, the server 14 may be programmed to utilize the wireless device identifier to search the memory 58 or database 78 to determine if the wireless device 22 is associated with any particular vehicle 12. As an example, the wireless device 22 may be the phone number of the user that owns the vehicle 12. If the query indicates that the wireless device 22 is associated with the particular vehicle 12, the server 14 may then automatically transmit the wireless device position data 88 to the particular vehicle 12.

In another example, the server 14 may be programmed to identify any vehicles (including vehicle 12) that are within proximity of the wireless device 22 at the time that the wireless device position data 88 is received. The server 14 may accomplish this using stored vehicle position data (which may include location coordinates as well as time stamps) for any of the vehicles that it services. In this example, the server 14 may then automatically transmit the wireless device position data 88 to any of the vehicles (including vehicle 12) that are identified as then-currently being within proximity of the wireless device 22.

As shown at reference numeral 202, the server 14 transmits the wireless device position data 88 to the processor 52 of the VCP 40 of the vehicle 12 associated with the wireless device 22, or to each processor 52 of each VCP 40 of each vehicle 12 that is identified as then-currently being within proximity of the wireless device 22.

Upon receiving the wireless device position data 88, the VCP 40 (through processor 52 running computer-readable instructions 56) compares the received wireless device position data 88 with the vehicle's preset range PR (i.e., a distance, boundary, etc. that defines how close the wireless device 22 has to be with respect to the vehicle position in order to trigger the advertising ON mode). This is shown at reference numeral 204. In particular, the preset range PR is shown as a geo-boundary around the vehicle 12 at reference numeral 204.

To make the comparison, the VCP 40 also obtains the vehicle's preset range PR (which is specific to each vehicle 12). The preset range PR may be stored in the memory 54 of the VCP 40, or in the memory 58 of the server 14, or in the database 78 of the center 16. When the preset range PR is stored in the memory 54, the VCP 40 may be programmed to retrieve the stored preset range PR and make the comparison with the wireless device position data 88. When the preset range PR is stored in the memory 58 of the server 14 or in the database 78 of the center 16, the VCP 40 may be programmed to send a request to the server 14, which retrieves the stored preset range PR and transmits it back to the VCP 40. In one example, the VCP 40 may receive the wireless device position data 88 and the vehicle's present range information simultaneously from the server 14.

Through the comparison of the wireless device position data 88 and the vehicle's preset range PR, the VCP 40 is programmed to determine whether the wireless device 22 is located within the preset range PR of the vehicle 12.

When the wireless device position data 88 indicates that the wireless device 22 is not located within (i.e., is outside) the preset range PR of the vehicle 12 ("N" in FIG. 3), the VCP 40 is programmed (by processor 52 running computer readable instructions 56) to transmit advertising OFF mode instructions to the low energy, short-range wireless communication module 32. This is shown at reference numeral 206. The advertising OFF mode instructions trigger or instruct the module 32 to enter the advertising OFF mode. The module 32 is responsive to the advertising OFF mode instructions from the VCP 40, and thus enters the advertising OFF mode. In the advertising OFF mode, the module 32 enters a sleep mode or turns itself off. When in sleep mode or turned off, the module 32 is inhibited from broadcasting the advertising event.

When the wireless device position data 88 indicates that the wireless device 22 is located within (i.e., is inside) the preset range PR ("Y" in FIG. 3), the VCP 40 is programmed (by processor 52 running computer readable instructions 56) to transmit advertising ON mode instructions to the low energy, short-range wireless communication module 32. This is shown at reference numeral 208. The advertising ON mode instructions trigger or instruct the module 32 to enter the advertising ON mode. The module 32 is responsive to the advertising ON mode instructions from the VCP 40, and thus enters the advertising ON mode.

As shown at reference numeral 210, when in the advertising ON mode, the module 32 is a peripheral device that can broadcast something (e.g., its presence and/or function(s)), through the advertising event AE, to the nearby wireless device 22, which is in listening/scanning mode. Since the wireless device 22 is within the short range and is an enabled device, the vehicle 12 and the wireless device 22 can perform an initial pairing, or if already paired, can establish the short-range wireless communication link 38.

Whether the module 32 is in the advertising OFF mode (reference numeral 206) or the advertising ON mode (reference numeral 210), the method 200 disclosed herein may be repeated when updated wireless device position data is received. This enables the module 32 to be switched between the ON and OFF modes, depending upon the then-current position of the vehicle 12 with respect to the then-current position of the wireless device 22.

When the wireless device 22 is not within the preset range PR of the vehicle 12, it may not be desirable to expose the vehicle 12, e.g., to unknown wireless devices, through advertising events. In examples of the method 200 when the wireless device 22 is associated with the vehicle 12 to whom the position data 88 is transmitted, undesirable vehicle 12 exposure may be reduced. Additionally, the method 200 may prolong the vehicle's battery life, in part because the module 32 is drawing little to no power from the battery in the OFF mode and is not needlessly transmitting advertising events AE when no wireless device 22 is around to receive them.

It is to be understood that the term "communication" as used herein is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be understood that the ranges provided herein include the stated range and any value or sub-range within the stated range. For example, a range of 100 meters or less should be interpreted to include the explicitly recited limits of 100 meters or less, as well as individual values, such as 80 meters, 45 meters, 15.5 meters, etc., and sub-ranges, such as from about 5 meters to about 40 meters, from about 10 meters to about 35 meters, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A system, comprising:
a vehicle; and
a vehicle communications platform operatively disposed in the vehicle and in communication with a server, the vehicle communications platform having a low energy, short-range wireless communication module having a maximum power consumption of fifteen milliamps and having a communication range of one hundred meters, the low energy, short-range wireless communication module including:
an advertising ON mode enabling the low energy, short-range wireless communication module to broadcast an advertising event to establish a short-range wireless communication link with a wireless device, wherein the advertising ON mode is triggered when i) first vehicle position data indicates that the vehicle is not at a position associated with an advertising OFF mode; and ii) first position data of a wireless device received from the server indicates that the wireless device is within a preset range of the vehicle; and
the advertising OFF mode inhibiting the low energy, short-range wireless communication module from broadcasting the advertising event, wherein the advertising OFF mode is triggered when at least one of i) second vehicle position data indicates that the vehicle is at the position associated with the advertising OFF mode; or ii) second position data of the wireless device received from the server indicates that the wireless device is not within the preset range of the vehicle.

2. The system as defined in claim 1 wherein the low energy, short-range wireless communication module further includes a low energy, short-range wireless communication node to establish the short-range wireless communication link with the wireless device.

3. The system as defined in claim 2, further comprising the wireless device.

4. The system as defined in claim 3 wherein the wireless device is a mobile device having a mobile device communications platform in communication with the server, the mobile device communications platform including:
a communications module to transmit at least one of the first position data or the second position data of the wireless device to the server; and
a mobile device low energy, short-range wireless communication module including:
a scanning mode; and
a mobile device low energy, short-range wireless communication node to establish the short-range wireless communication link with the low energy, short-range wireless communication node.

5. The system as defined in claim 1, further comprising a server, wherein the server includes:
a processor;
a memory having stored therein the position associated with the advertising OFF mode and the preset range; and
computer readable instructions stored on the memory, the computer readable instructions, when executed by the processor, are to transmit any of the first vehicle position data, the first position data of the wireless device, the second vehicle position data, or the second position data of the wireless device.

6. The system as defined in claim 1 wherein the vehicle communications platform further comprises:
an in-vehicle microprocessor;
a memory; and
computer readable instructions stored on the memory, the computer readable instructions, when executed by the in-vehicle microprocessor, cause the in-vehicle microprocessor to perform at least one of:
i) compare the first or second vehicle position data with the position associated with the advertising OFF mode; or
ii) determine whether the wireless device is within the preset range of the vehicle; and
transmit advertising mode instructions to the low energy, short-range wireless communication module based upon at least one of (1) the comparison of the first or second vehicle position data with the position associated with the advertising OFF mode or (2) the determination of whether the wireless device is within the preset range of the vehicle.

7. The system as defined in claim 6 wherein the memory of the vehicle communications platform has stored therein the position associated with the advertising OFF mode and the preset range.

8. The system as defined in claim 6 further comprising a server, wherein the server is responsive to a request from the vehicle communications platform for the position associated with the advertising OFF mode and the preset range.

9. A computer-implemented method for enabling or inhibiting low energy, short-range wireless communication advertisements, comprising:
    receiving, via a processor, vehicle position data for a vehicle;
    comparing, via the processor, the received vehicle position data with a position associated with an advertising OFF mode;
    triggering, via the processor, a low energy, short-range wireless communication module of a vehicle communications platform to enter an advertising ON mode when the position data indicates that the vehicle is not at the position associated with the advertising OFF mode, wherein the vehicle communications platform broadcasts an advertising event to establish a short-range wireless communication link with a wireless device upon entering the advertising ON mode, the short-range wireless communication module having a maximum power consumption of fifteen milliamps and having a communication range of one hundred meters; and
    triggering, via the processor, the low energy, short-range wireless communication module of the vehicle communications platform to enter the advertising OFF mode when the position data indicates that the vehicle is at the position associated with the advertising OFF mode.

10. The computer-implemented method as defined in claim 9, further comprising retrieving the position associated with the advertising OFF mode from a memory of the vehicle communications platform.

11. The computer-implemented method as defined in claim 9, further comprising: transmitting the position associated with the advertising OFF mode request to a server; and receiving the position associated with the advertising OFF mode from the server.

12. The computer-implemented method as defined in claim 9 wherein prior to receiving the vehicle position data, the method further comprises:
    recognizing, at a vehicle communications platform in the vehicle, that the vehicle is in park mode; and
    requesting the vehicle position data from a server in communication with the vehicle communications platform.

13. The computer-implemented method as defined in claim 9 wherein the low energy, short-range wireless communication module enters the advertising ON mode, and wherein the method further comprises:
    receiving updated vehicle position data;
    determining that the updated vehicle position data corresponds with the position associated the advertising OFF mode; and
    triggering the low energy, short-range wireless communication module to switch from the advertising ON mode to the advertising OFF mode.

14. The computer-implemented method as defined in claim 9 wherein the triggering of the low energy, short-range wireless communication module to enter the advertising ON mode is accomplished by transmitting advertising ON mode instructions from the vehicle communications platform, wherein the low energy, short-range wireless communication module is responsive to the advertising ON mode instructions.

15. The computer-implemented method as defined in claim 9 wherein the triggering of the low energy, short-range wireless communication module to enter the advertising OFF mode is accomplished by transmitting advertising OFF mode instructions from the vehicle communications platform, wherein the low energy, short-range wireless communication module is responsive to the advertising OFF mode instructions.

16. A computer-implemented method for enabling or inhibiting low energy, short-range wireless communication advertisements from a low energy, short-range wireless communication module of a vehicle communications platform of vehicle, comprising:
    receiving, at a processor, position data from a wireless device outside of the vehicle;
    comparing, via the processor, the received position data from the wireless device with a preset range;
    triggering, via the processor, the low energy, short-range wireless communication module to enter an advertising ON mode when the position data indicates that the wireless device is within the preset range and vehicle position data indicates that the vehicle is not at a position associated with an advertising OFF mode, wherein the vehicle communications platform broadcasts an advertising event to establish a short-range wireless communication link with a wireless device upon entering the advertising ON mode; and
    triggering, via the processor, the low energy, short-range wireless communication module to enter the advertising OFF mode when the position data indicates that the wireless device is outside the preset range, the low energy, short-range wireless communication module having a maximum power consumption of fifteen milliamps and having a communication range of one hundred meters.

17. The computer-implemented method as defined in claim 16 wherein:
    the preset range is specific to the vehicle; and
    the preset range is received with the position data.

18. The computer-implemented method as defined in claim 16 wherein the low energy, short-range wireless communication module enters the advertising ON mode, and wherein the method further comprises:
    receiving updated position data from the wireless device;
    determining that the updated position data is outside the preset range; and
    triggering the low energy, short-range wireless communication module to switch from the advertising ON mode to the advertising OFF mode.

19. The computer-implemented method as defined in claim 16 wherein the triggering of the low energy, short-range wireless communication module to enter the advertising ON mode is accomplished by transmitting advertising ON mode instructions.

20. The computer-implemented method as defined in claim 16 wherein the triggering of the low energy, short-range wireless communication module to enter the advertising OFF mode is accomplished by transmitting advertising OFF mode instructions from the vehicle communications platform, wherein the low energy, short-range wireless communication module is responsive to the advertising OFF mode instructions.

\* \* \* \* \*